March 20, 1956 — R. D. BOISJOLIE — 2,739,277
CAPACITOR EYELET CONSTRUCTION
Filed June 26, 1951

RALPH D. BOISJOLIE
INVENTOR.

BY Arthur G. Connolly
HIS ATTORNEY

United States Patent Office 2,739,277
Patented Mar. 20, 1956

2,739,277
CAPACITOR EYELET CONSTRUCTION

Ralph D. Boisjolie, North Adams, Mass., assignor to Sprague Electric Company, a corporation of Massachusetts Application June 26, 1951, Serial No. 233,574

1 Claim. (Cl. 317—260)

This invention relates to a new and improved capacitor eyelet construction.

More specifically, this invention is concerned with improving the eyelet construction used in smaller molded electrical capacitors of the type illustrated in Robinson et al. Patent 2,526,688, issued October 14, 1950. Capacitor eyelets as shown in this patent are broadly satisfactory for impregnating rolled capacitor units. However, considerable difficulty has been had with these eyelets because of the difficulty in positioning the lead wires within them in such a manner that these wires will stay in position during the processing of the capacitor unit. Also there has been a considerable problem due to these wires breaking from the eyelet at the solder seals used to seal the capacitor unit.

It is an object of this invention to provide such an eyelet which holds the lead wire for a capacitive unit in position in such a manner that the entire unit may be processed with the lead in its final position. A further object is to form an eyelet construction in which there is less likelihood of the condenser terminal lead breaking than there is with conventional capacitor construction as exemplified by the Robinson et al. patent. Further objects will appear from this specification and the appended claim.

Figure 1:
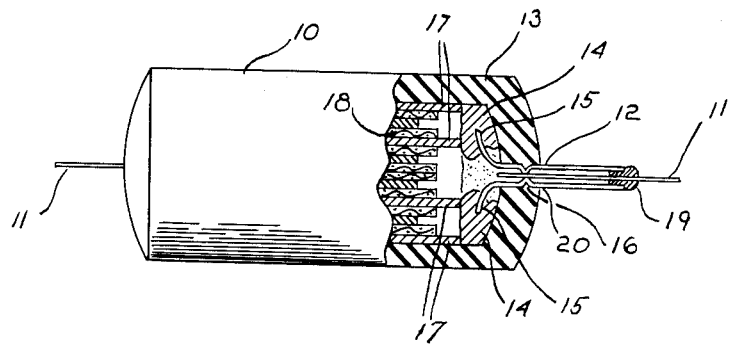
Figure 2:
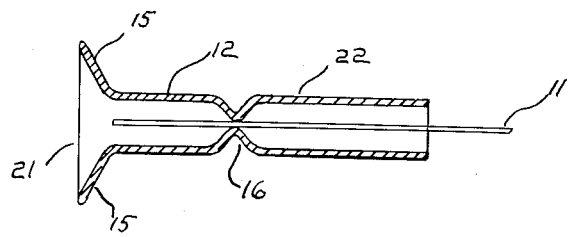

Referring specifically to the drawings, Fig. 1 shows a small rolled capacitor unit, partially in section, showing the eyelet construction of this invention; Fig. 2 illustrates in greater detail a sectional view of the eyelet construction of Fig. 1 before it is sealed; and Fig. 3 shows a view taken at right angles to the view shown in Fig. 2 of this eyelet construction.

The condenser unit 10, as shown in Fig. 1, is formed of a number of convolutely wound alternate electrodes and dielectric spacers 18. One set of electrodes 17 project from the end of the rolled unit 18 and are in contact with the solder mass 14 positioned within the molded casing 13. This casing is provided with an appropriate opening 20 through which the lead-in member or eyelet 12 projects. Flanges 15 on the inner end of this lead-in member are held in position by the solder mass 14. A suitable lead wire 11 projects into the eyelet 12 through the solder seal 19 past the crimped joint 16 (where it is held in position) and the inner edge of the molded casing 13. The joint 16 is completely surrounded by the casing 13 so that the eyelet is prevented from either being twisted, pushed, or pulled out of position.

Figure 3:
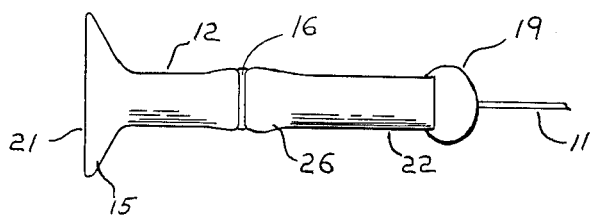

The construction of the eyelet 12 is seen in Figs. 2 and 3, in which like numerals designate the same parts as shown in Fig. 1. The lead-in wire 11 is held within the eyelet 12 by means of the crimped joint 16 formed after the wire has been positioned within the eyelet. Any suitable means of formation may be used, although it is contemplated to use opposing jaws of a crimping tool for this operation. A semi-flat portion 26 is formed in the eyelet 12 separating the main body portion 21 of the eyelet from the extending cylindrical body portion 22. The crimped joint 16 is only formed with such force as will position the wire 11 within the eyelet; an opening is left around the lead-in wire so that suitable impregnating compositions may be conveniently injected into the unit 10. Suitable impregnation details are described in the Robinson et al. Patent 2,526,688. The bell-like portion 21 of the eyelet formed with the flanges 15, is manufactured to be rigidly held within the casing 13 by the solder mass 14. It is to be understood that this casing 13 is molded around the unit and the bell portion 21, as described in the Robinson et al. patent. After the condenser unit 10 has been impregnated the open end of the eyelet is sealed with a solder mass 19 which projects a substantial distance into the end of the eyelet.

Those skilled in the art will realize that lead-in wires positioned in the manner indicated by the crimp in a conventional eyelet construction, are particularly well adapted to stand the rigorous handling normally given condenser units. Even if the solder seal 19 is broken the lead-in wire still is held in electrical contact with the eyelet so that the condenser will continue functioning. However, it is not likely that this seal will be broken, because the wire 11 going through it is rigidly held in position at the inner side of the seal.

The eyelet construction forming the subject matter of this invention is readily adaptable to other applications besides rolled condenser units. For example, it may be used with small molded resistance elements. It is to be understood that the inventive concept here involved is broader than the specific example given and is to be limited only by the scope of the appended claim.

I claim:

In a rolled condenser unit having a molded outer shell wall, an eyelet projecting through said shell wall, a flange on the end of said eyelet, said flange firmly anchored in position by a metal mass electrically connecting it to said condenser unit, a lead-in wire projecting through said eyelet, said eyelet being firmly crimped at one spot on both sides of said lead-in wire so as to prevent said wire from moving longitudinally in said eyelet and so as to leave the opening through said eyelet, said crimped spot being encased by the confines of said shell wall, and a terminal seal closing the end of said eyelet removed from said condenser unit.

References Cited in the file of this patent

UNITED STATES PATENTS

| 1,796,683 | Carlson | Mar. 17, 1931 |
| 1,850,105 | Higginbottom | Mar. 22, 1932 |
| 1,973,039 | Benedek | Sept. 11, 1934 |
| 2,470,280 | Ackerman | May 17, 1949 |
| 2,526,688 | Robinson | Oct. 14, 1950 |
| 2,651,100 | Grouse | Sept. 8, 1953 |
| 2,682,626 | Robinson | June 29, 1954 |